(12) United States Patent
Buschmann et al.

(10) Patent No.: US 10,373,476 B2
(45) Date of Patent: *Aug. 6, 2019

(54) PREVENTING THE LOSS OF WIRELESS ACCESSORIES FOR MOBILE DEVICES

(71) Applicant: INTERNATIONAL BUSINESS MACHINES CORPORATION, Armonk, NY (US)

(72) Inventors: Luke N. Buschmann, New Paltz, NY (US); Brad Hoover, Poughkeepsie, NY (US); John Werner, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,117

(22) Filed: Nov. 1, 2017

(65) Prior Publication Data
US 2019/0096226 A1     Mar. 28, 2019

Related U.S. Application Data

(63) Continuation of application No. 15/714,036, filed on Sep. 25, 2017.

(51) Int. Cl.
*G08B 21/24*     (2006.01)
*G08B 21/22*     (2006.01)
(Continued)

(52) U.S. Cl.
CPC ............ *G08B 21/24* (2013.01); *G08B 21/22* (2013.01); *H04M 1/7253* (2013.01); *H04W 4/02* (2013.01)

(58) Field of Classification Search
CPC ...................................................... G08B 21/24
(Continued)

(56) References Cited

U.S. PATENT DOCUMENTS

| 9,286,783 | B1* | 3/2016 | Teller | ............... G08B 21/24 |
| 2006/0128430 | A1* | 6/2006 | Shin | ............... H04M 1/6041 |
| | | | | 455/557 |

(Continued)

OTHER PUBLICATIONS

Buschmann et al., "Preventing the Loss of Wireless Accessories for Mobile Devices"; U.S. Appl. No. 15/714,036, filed Sep. 25, 2017.
(Continued)

*Primary Examiner* — Santiago Garcia
(74) *Attorney, Agent, or Firm* — Cantor Colburn LLP; Teddi Maranzano

(57) ABSTRACT

Embodiments include methods, systems and computer program products for preventing the loss of wireless accessories for mobile devices. Aspects include calculating, by a processor, a distance between a mobile device and at least one of two or more wireless accessories in communication with the mobile device an determining whether the distance between the mobile device and the at least one of two or more wireless accessories is greater than a first threshold distance. Aspects also include generating an alert by the mobile device that indicates that the at least one of two or more wireless accessories is greater than the threshold distance away from the mobile device based on a determination that the distance between the mobile device and the at least one of two or more wireless accessories is greater than the first threshold distance.

7 Claims, 7 Drawing Sheets

(51) Int. Cl.
*H04W 4/02* (2018.01)
*H04M 1/725* (2006.01)

(58) Field of Classification Search
USPC .................................................. 340/539.32
See application file for complete search history.

(56) References Cited

U.S. PATENT DOCUMENTS

| | | | | |
|---|---|---|---|---|
| 2007/0224980 A1* | 9/2007 | Wakefield | .......... | G08B 13/1427 455/418 |
| 2008/0248794 A1* | 10/2008 | Mirza-Baig | ......... | H04L 41/0809 455/423 |
| 2011/0140924 A1* | 6/2011 | Sennett | .................. | G08C 17/02 340/944 |
| 2012/0284014 A1* | 11/2012 | Zivkovic | ............... | G06F 17/289 704/3 |
| 2013/0018826 A1* | 1/2013 | Sundararajan | ...... | H04L 12/6418 706/12 |
| 2015/0154847 A1* | 6/2015 | Oliver | .................... | H04W 4/80 340/686.6 |
| 2015/0169597 A1* | 6/2015 | Edge | .................... | G06F 17/3087 707/751 |
| 2016/0063847 A1* | 3/2016 | Hawkins | ................ | G08B 21/24 340/539.11 |
| 2016/0080581 A1* | 3/2016 | Sweeney | ............... | H04M 19/04 455/458 |
| 2016/0350776 A1* | 12/2016 | High | .................. | G06Q 30/0205 |
| 2016/0371763 A1* | 12/2016 | Wang | ..................... | G06F 3/048 |
| 2017/0092090 A1* | 3/2017 | Lerner | ............... | G06K 7/10366 |
| 2017/0094597 A1* | 3/2017 | Su | ..................... | H04W 52/0209 |
| 2017/0155751 A1* | 6/2017 | Vissa | ................. | H04M 1/72527 |
| 2017/0353829 A1* | 12/2017 | Kumar | ................. | H04W 4/029 |

OTHER PUBLICATIONS

List of IBM Patents or Patent Applications Treated as Related; (Appendix P), Date Filed Nov. 1, 2017; 2 pages.

* cited by examiner

PREVENTING THE LOSS OF WIRELESS ACCESSORIES FOR MOBILE DEVICES

DOMESTIC PRIORITY

This application is a continuation of the legally related U.S. application Ser. No. 15/714,036 filed Sep. 25, 2017, which is fully incorporated herein by reference.

BACKGROUND

The present disclosure relates to wireless accessories for mobile devices and more specifically, to methods, systems and computer program products for preventing the loss of wireless accessories for mobile devices.

The use of smartphones, tablets and other mobile devices has become ubiquitous. In addition, the use of wireless accessories for these mobile devices has been increasing in recent years. Advances in electronics and battery technology have led to the development of smaller and smaller wireless accessories.

The use of wireless earbuds is continuously growing due to their small lightweight design and ability to deliver high-quality audio. Due to their small size, it is easy to lose one or both of the earbuds. Currently, there is no system to detect when a user unknowingly dropped or forgot one or more earbuds or a warning system so that loss can be prevented.

SUMMARY

In accordance with an embodiment, a method for preventing the loss of wireless accessories for mobile devices is provided. The method includes calculating, by a processor, a distance between a mobile device and at least one of two or more wireless accessories in communication with the mobile device and determining whether the distance between the mobile device and the at least one of two or more wireless accessories is greater than a first threshold distance. The method also includes generating an alert by the mobile device that indicates that the at least one of two or more wireless accessories is greater than the threshold distance away from the mobile device based on a determination that the distance between the mobile device and the at least one of two or more wireless accessories is greater than the first threshold distance.

In accordance with another embodiment, a mobile device configured to communicate with multiple wireless accessories is provided. The mobile device includes a processor in communication with one or more types of memory. The processor is configured to calculate a distance between a mobile device and at least one of two or more wireless accessories in communication with the mobile device and determine whether the distance between the mobile device and the at least one of two or more wireless accessories is greater than a first threshold distance. The processor is also configured to generate an alert by the mobile device that indicates that the at least one of two or more wireless accessories is greater than the threshold distance away from the mobile device based on a determination that the distance between the mobile device and the at least one of two or more wireless accessories is greater than the first threshold distance.

In accordance with a further embodiment, a computer program product for preventing the loss of wireless accessories for mobile devices includes a non-transitory storage medium readable by a processing circuit and storing instructions for execution by the processing circuit for performing a method. The method includes calculating a distance between a mobile device and at least one of two or more wireless accessories in communication with the mobile device and determining whether the distance between the mobile device and the at least one of two or more wireless accessories is greater than a first threshold distance. The method also includes generating an alert by the mobile device that indicates that the at least one of two or more wireless accessories is greater than the threshold distance away from the mobile device based on a determination that the distance between the mobile device and the at least one of two or more wireless accessories is greater than the first threshold distance.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

In accordance with exemplary embodiments of the disclosure, methods, systems, and computer program products for preventing the loss of wireless accessories for mobile devices are provided. In exemplary embodiments, a mobile device, such as a smartphone or tablet, is configured to detect and notify users of dropped or forgotten wireless accessories to help prevent loss of such a small device. Although the wireless accessories discussed herein are often discussed in the context of being wireless earbuds, it will be apparent to those of ordinary skill in the art that the teachings herein can be applied to other wireless accessories.

In exemplary embodiments, the distance between earbuds and the mobile device is calculated as well as the distance between the earbuds themselves and notifications are generated by the mobile device if the distance exceeds a predetermined threshold. In some embodiments, the GPS location of the mobile device may affect the threshold distance. Once the threshold distance is exceeded, distance measurements can be made more frequently to triangulate the precise location of the separated earbud(s).

Figure 1:
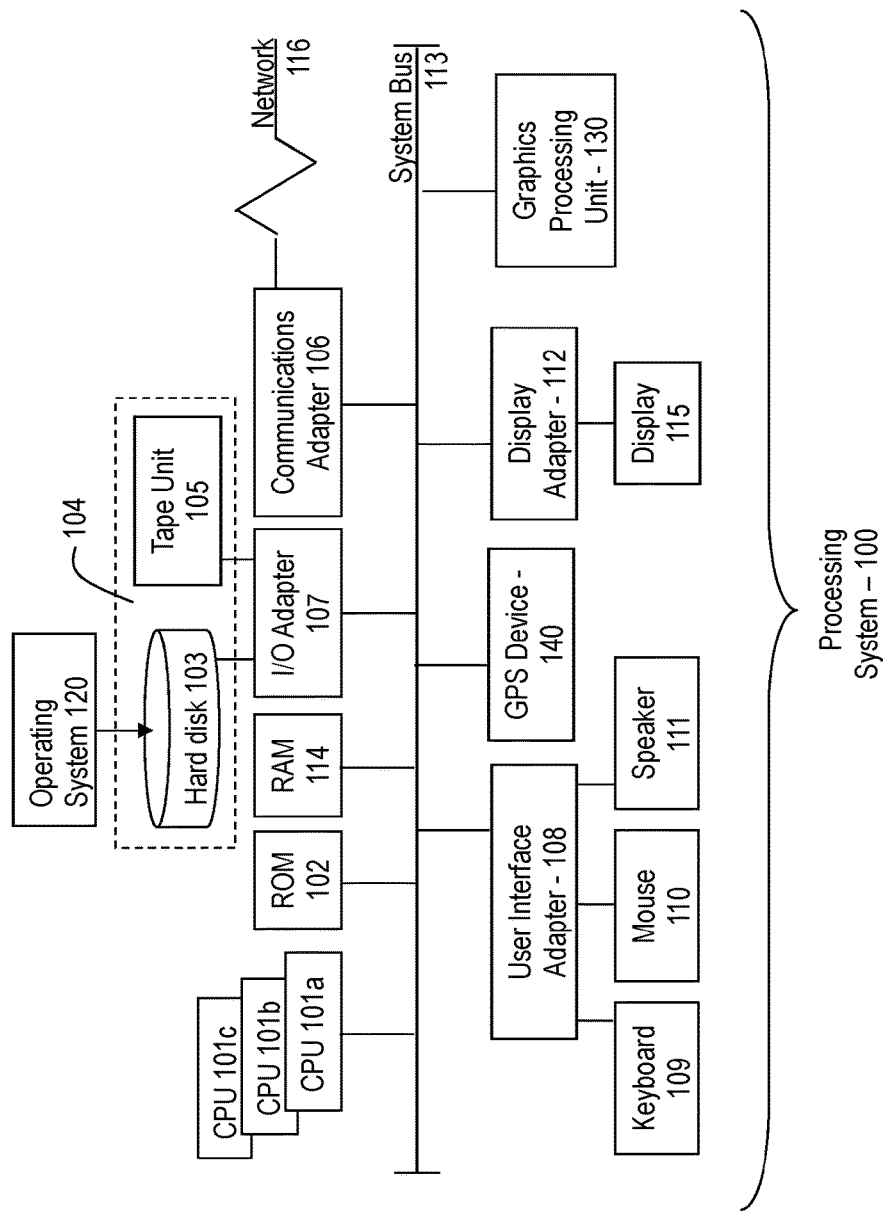
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 1 further depicts an input/output (I/O) adapter 107, a network adapter 106, and a GPS device 140 coupled to the system bus 113. I/O adapter 107 may be a small computer system interface (SCSI) adapter that communicates with flash storage, a hard disk 103 and/or tape storage drive 105 or any other similar component. I/O adapter 107, flash storage, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2A:
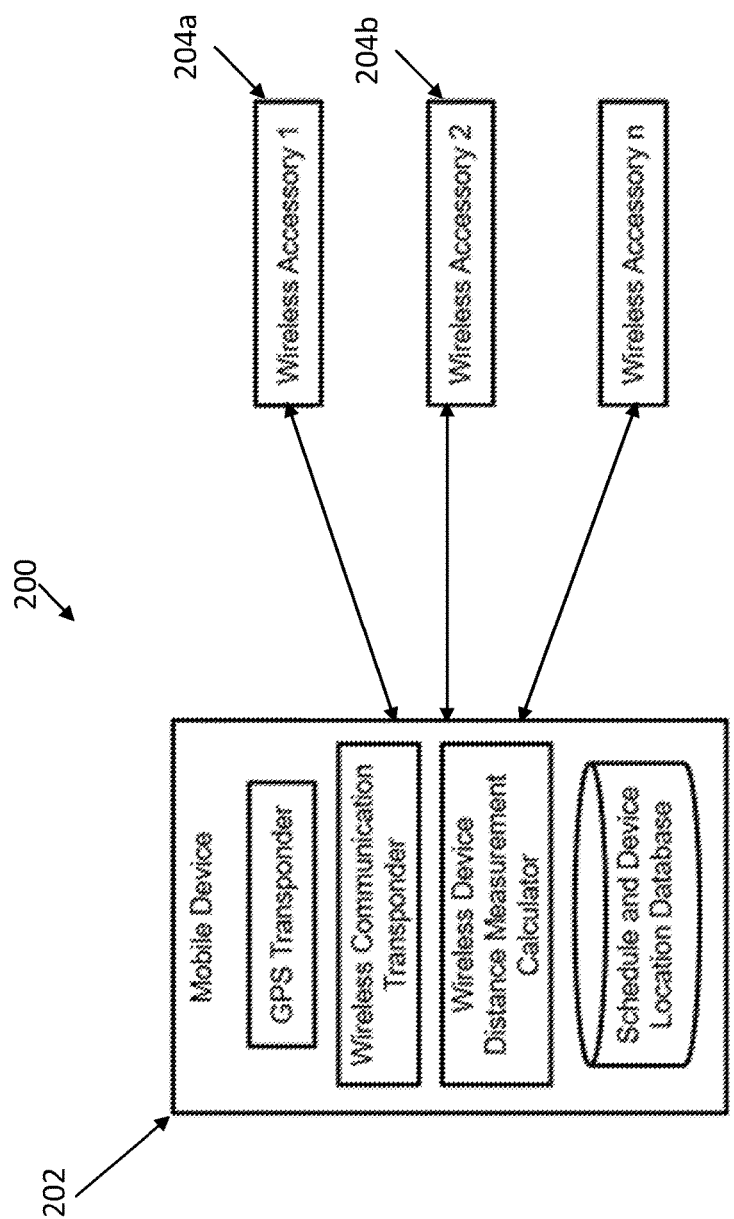
FIG. 2A is a block diagram illustrating a system for preventing the loss of wireless accessories for mobile devices in accordance with an exemplary embodiment.

Referring now to FIG. 2, a system 200 for preventing the loss of wireless accessories for mobile devices is illustrated. As illustrated, the system 200 includes a mobile device 202 that is in communication with one or more wireless accessories 204. The mobile device may be a smartphone, a tablet, or any other suitable device such as the one shown in FIG. 1. In one embodiment the wireless accessories 204a, 204b can be a pair of wireless earbuds that are used to play audio from the mobile device 202. The wireless accessories 204 can use any known wireless communications protocol to communicate with the mobile device 202 and optionally with one another. In one embodiment, Bluetooth™ may be used for the wireless communication. In order to increase user satisfaction, the manufacturers of wireless accessories 204 design the wireless accessories 204 to have a large communications range between the wireless accessories 204 and the mobile device 202. Accordingly, a system that simply determines when a wireless accessory 204 goes out of wireless range of the mobile device 202 may be sufficient to prevent loss of the wireless accessory 204. Also, if the accessories 204 are not in use, the user may not even know when one or more wireless accessories 204 are out of wireless range.

Figure 2B:
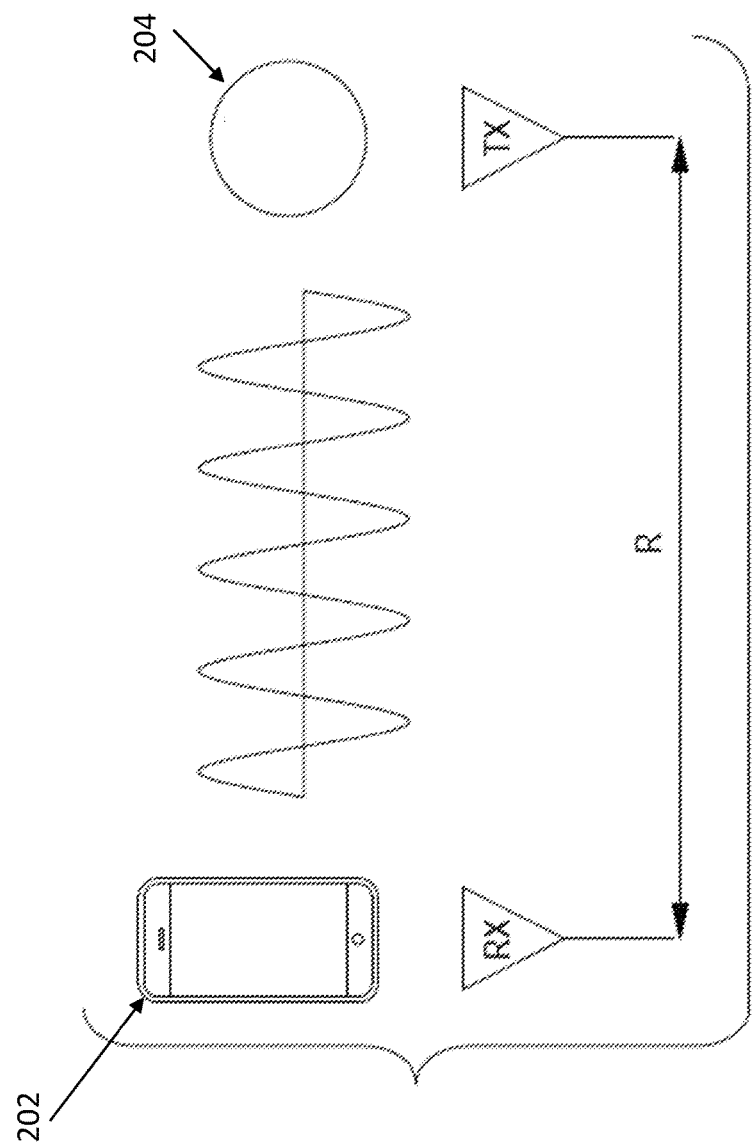
FIG. 2B is a schematic diagram illustrating a system for measuring a distance between a wireless accessory and a mobile device in accordance with an exemplary embodiment.

In exemplary embodiments, the mobile device 202 is configured to monitor the distance between the mobile device 202 and each of the wireless accessories 204a, 204b. As shown in FIG. 2B, the distance between the mobile device 202 and each of the wireless accessories 204 can be determined based on Friis transmission equation:

$$R = \frac{\lambda}{4\pi \sqrt{\frac{P_t}{P_r G_t G_r}}}$$

Where $\lambda$=Wavelength (0.125 m for Bluetooth), $P_t$=Power transmitted (wireless accessory), $P_r$=Power received (mobile device), $G_t$=Gain of transmitting antenna (wireless accessory), $G_r$=Gain of receiving antenna (mobile device), and R=Distance. In other embodiments, other methods of measuring the distance between the mobile device 202 and each of the wireless accessories 204 can be used. In one embodiment, these measurements and distances are correlated with the GPS location of the mobile device to track the absolute location of the wireless accessories. In exemplary embodiments, the measurement of the distances can be made more frequently upon detection of an earbud exceeding a threshold distance to allow for accurate triangulation of a separated earbud.

Figure 2C:
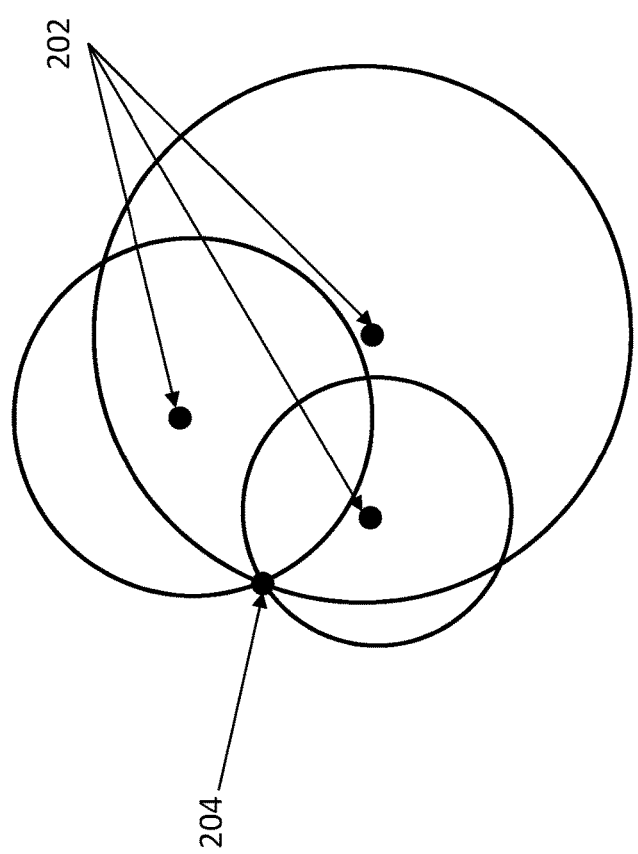
FIG. 2C is a schematic diagram illustrating a system for identifying a location of a wireless accessory for mobile device in accordance with an exemplary embodiment.

For example, as shown in FIG. 2C as the mobile device 202 moves, the exact GPS location of the mobile device 202 and the distance from the mobile device 202 to the wireless accessory 204 is measured. Once a sufficient number of measurements are made, the exact location of the wireless accessory 204 can be determined using known triangulation methods.

In exemplary embodiments, the mobile device 202 is configured to generate an alert once it is determined that one of the wireless accessories 204a is greater than a predetermined distance away from either the mobile device 202 or from the other wireless accessories 204b. The alert may be an audible alert that is played through the wireless accessories 204b and/or through a speaker of the mobile device 202. Likewise, the alert may be a tactile alert that is provided by the mobile device 202, pop-up notification on the screen of the mobile device 20, an email, text message or a phone call. In exemplary embodiments, the alert can include a message displayed on the mobile device 202 that includes a GPS location of the wireless accessories 204a, in case the user does not see the notification right away.

Figure 3:
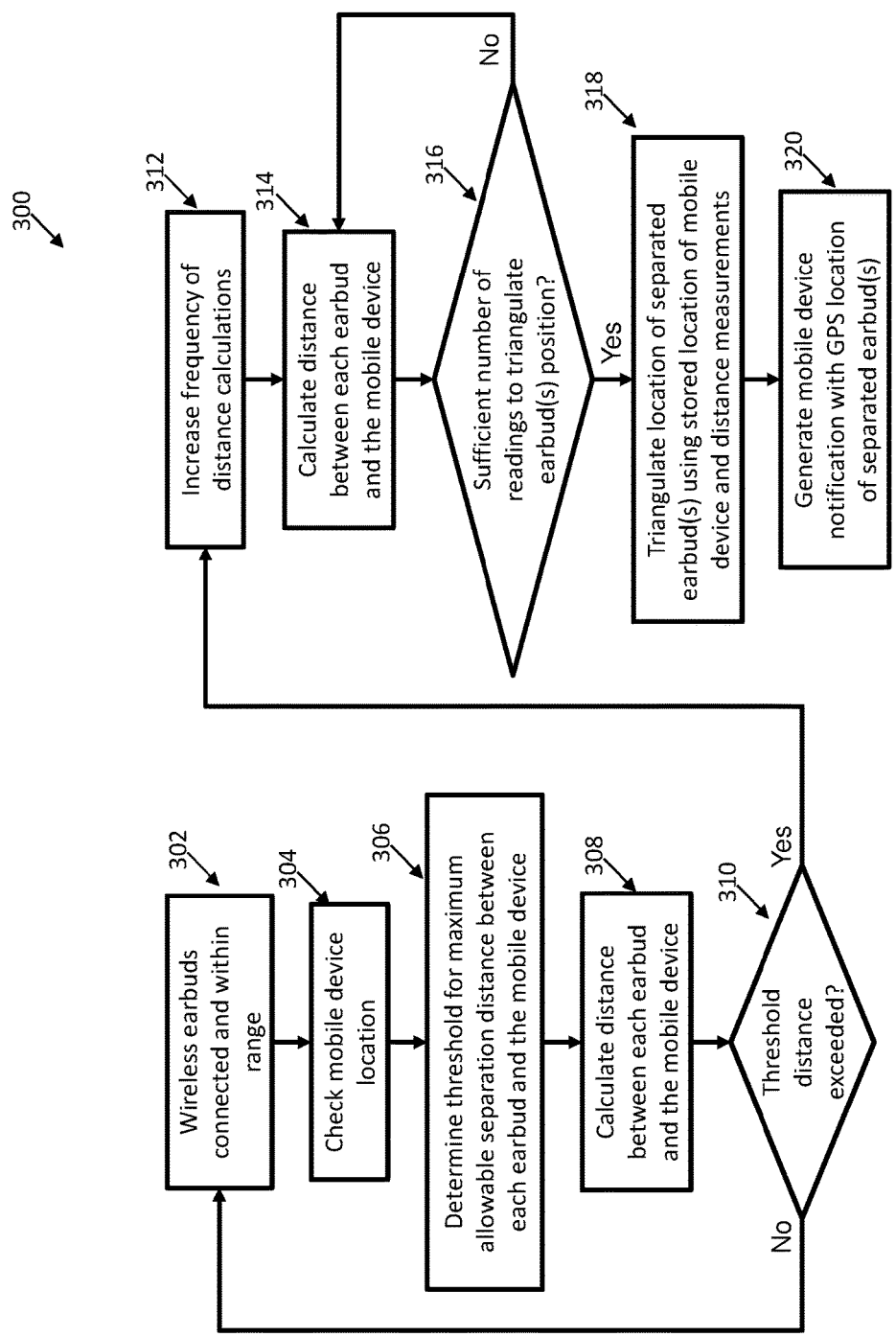
FIG. 3 is a flow diagram of a method for preventing the loss of wireless accessories for mobile devices in accordance with an exemplary embodiment.

FIG. 3 is a flow diagram of a method 300 for preventing the loss of wireless accessories for mobile devices in accordance with an exemplary embodiment. As shown at block 302, the method 300 includes determining that the wireless earbuds are connected to, and are within range of, the mobile device. Next, as shown at block 304, the method 300 includes determining the location of the mobile device. In exemplary embodiments, the location can be determined using GPS, cellular triangulation, WiFi location, or the like. The method 300 also includes determining a threshold for maximum allowable separation distance between each earbud and the mobile device, as shown at block 306. In exemplary embodiments, different threshold distances can be used for a maximum allowable distance between an earbud and the mobile device and between each of the earbuds, these two thresholds may be the same distance or they may be different. Next, as shown at block 308, the method 300 includes calculating a distance between each earbud and the mobile device. In exemplary embodiments, the distance between each earbud and the mobile device can be calculated at a predetermined frequency, such as once every thirty seconds. At decision block 310, it is determined if the calculated distance exceeds a threshold. If the calculated distance does not exceed the threshold, the method 300 returns to block 302. Otherwise, the method 300 proceeds to block 312.

As shown at block 312, the method 300 includes increasing a frequency of distance calculations (e.g., once per second). Next, the method 300 includes calculating a distance between each earbud and the mobile device, as shown at block 314. At decision block 316, it is determined if there are a sufficient number of distance readings to triangulate a position of the earbud(s) that has exceeded the threshold distance. If there are a sufficient number of distance readings, the method 300 proceeds to block 318 and the location of separated earbud(s) is triangulated. Otherwise, the method 300 returns to block 314 and calculates another distance reading. Once the position of the earbud has been determined, the method 300 includes generating a mobile device notification with the location of separated earbud(s). In one embodiment, the alert can be provided to the user via a user interface of the mobile device. The provided GPS location may be used by users to map a path back to the location of the separated earbud. When the user is in wireless range of the earbud (if it still has power) distance measurements may be provided to direct the user towards the separated earbud in case it has moved slightly since the calculation was taken (e.g., accidentally kicked by another person walking by).

Figure 4:
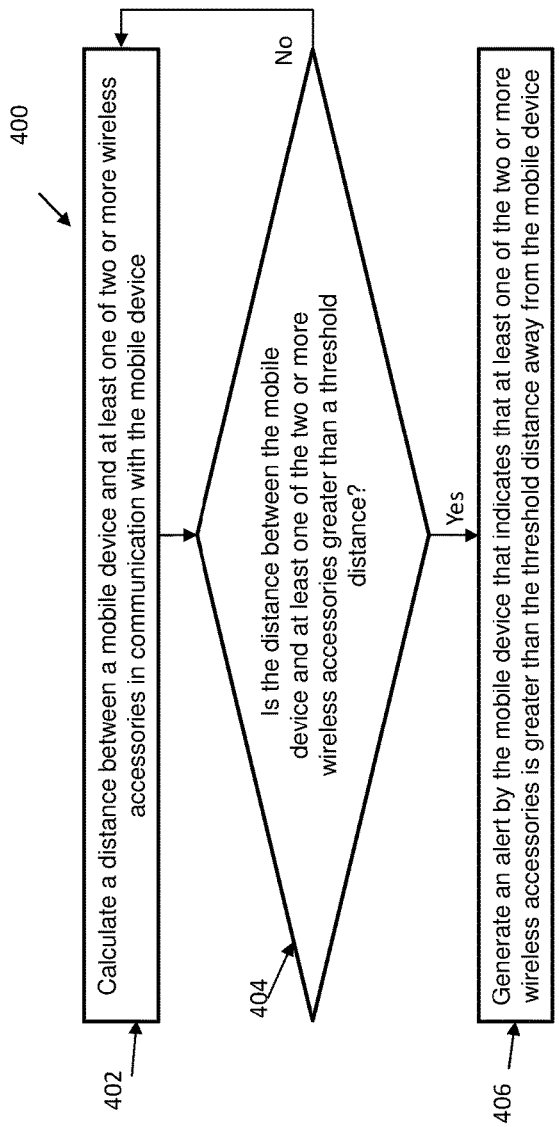
FIG. 4 is a flow diagram of another method for preventing the loss of wireless accessories for mobile devices in accordance with an exemplary embodiment.

FIG. 4 is a flow diagram of a method 400 for preventing the loss of wireless accessories for mobile devices in accordance with an exemplary embodiment. As shown at block 402, the method 400 includes calculating a distance between a mobile device and at least one of two or more wireless accessories in communication with the mobile device. In an exemplary embodiment, the distance between the mobile device and the wireless accessories is calculated using the Friis transmission equation. Next, as shown at decision block 404 the method 400 includes determining if the distance between the mobile device and the at least one of the two or more wireless accessories is greater than a threshold distance. In exemplary embodiments, the threshold distance may be determined based on a location of the mobile device. If the distance between the mobile device and the at least one of the two or more wireless accessories is greater than a threshold distance, the method 400 proceeds to block 406. Otherwise, the method 400 returns to block 402. As shown at block 406, the method includes generating an alert by the mobile device that indicates that the at least one of the two or more wireless accessories is greater than the threshold distance away from the mobile device. In exemplary embodiments, the alert may be provided using a user interface of the mobile device, a speaker of the mobile device, or through one or more of the wireless accessories if more than one is connected.

Figure 5:
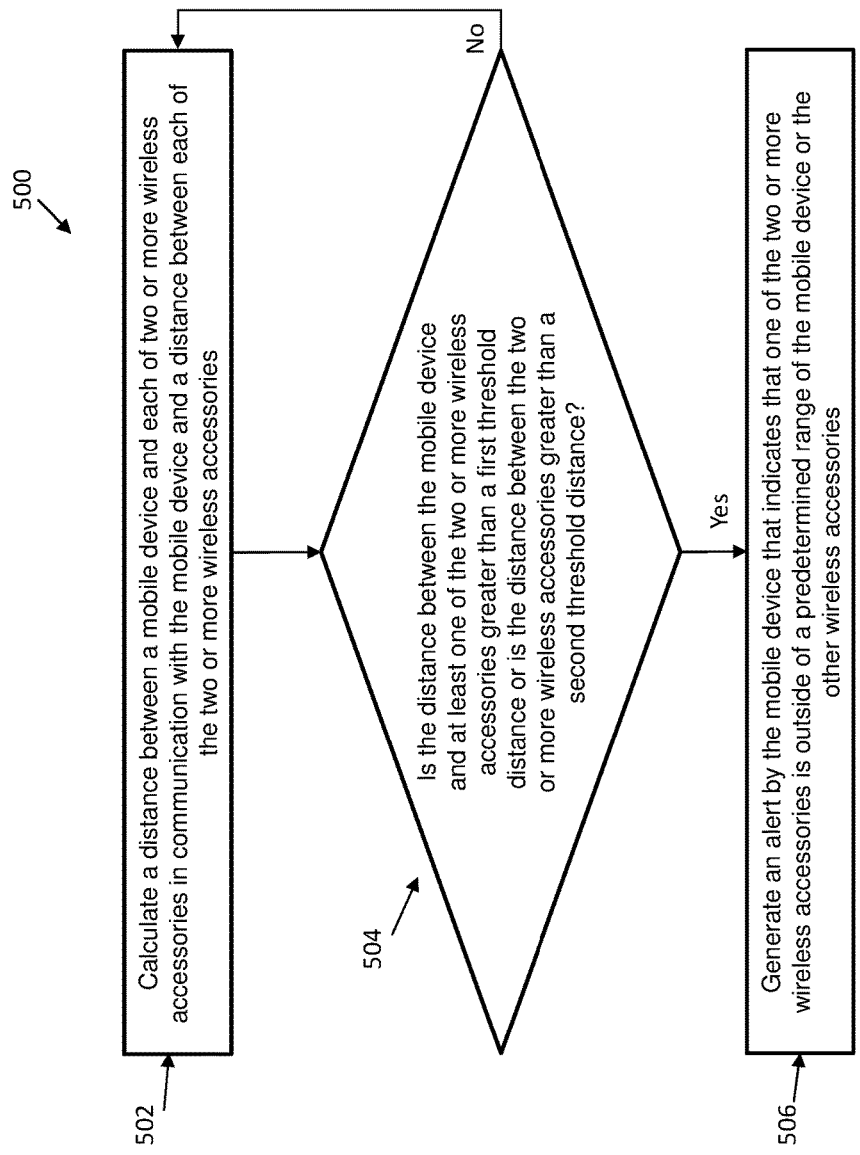
FIG. 5 is a flow diagram of a further method for preventing the loss of wireless accessories for mobile devices in accordance with an exemplary embodiment.

FIG. 5 is a flow diagram of a method 500 for preventing the loss of wireless accessories for mobile devices in accordance with an exemplary embodiment. As shown at block 502, the method 500 includes calculating a distance between a mobile device and each of two or more wireless accessories in communication with the mobile device and a distance between each of the two or more wireless accessories. Next, as shown at decision block 504, the method 500 includes determining if the distance between the mobile device and at least one of the two or more wireless accessories is greater than a first threshold distance or if the distance between the two or more wireless accessories is greater than a second threshold distance. If either the distance between the mobile device and one of two or more wireless accessories is greater than the first threshold distance or if the distance between the two or more wireless accessories is greater than a second threshold distance, the method proceeds to block 506. Otherwise, the method returns to block 502.

In exemplary embodiments, one or both of the first threshold distance and the second threshold distance may be determined based on a location of the mobile device. For example, a user can set first and second threshold values to be larger distances when they are at home or at work and can set the first and second threshold values to be smaller distances when they are at other locations. Likewise, the threshold values can be further linked to the time of day. In exemplary embodiments, determining the distance between each of the two or more wireless accessories includes determining a location of each of the two or more wireless accessories and calculating the distance between each of the two or more wireless accessories.

In further embodiments, the location data for the mobile device can also be learned using pattern recognition or utilized from existing data on the user. This location data can be used to set the threshold values. Likewise, the mobile device can use the state of the user, which can be inferred from one or more sensors in the mobile device, to adaptively set the threshold distances. For example, if a user is stationary the threshold distances may be larger than when the user is walking or running.

In one embodiment, the mobile device may default to a 100 ft threshold value for the distance between the mobile device and the wireless accessory when the user is at a location that has been determined to be their home. The determination that a location is the user's home may be made based on a location that the mobile device is on a number of consecutive nights. Likewise, the mobile device may default to a 20 ft threshold value for the distance between the mobile device and the wireless accessory when the user is at a location that has been determined to be a hotel. The determination that a location is a hotel can be made based on a GPS location that the mobile device is at or based on a WiFi network that the mobile device is connected to. In another embodiment, the mobile device may default to a 10 ft threshold value for the distance between the mobile device and the wireless accessory when the user is at a location that has been determined to be at a gym. The determination that a location is a gym be made based on a GPS location that the mobile device is at or based on a WiFi network that the mobile device is connected to. In yet another embodiment, the mobile device may default to a 5 ft threshold value for the distance between the mobile device and the wireless accessory when the mobile device is moving and not at a known location, for example, if the user is walking on a city street. The determination that the user of the mobile device is moving can be based on readings from accelerometers of the mobile device, a GPS chip of a mobile device, or the like.

Continuing with reference to FIG. 5, as shown at block 506, the method 500 includes generating an alert by the mobile device that indicates that at least one of the two or more wireless accessories is outside of a predetermined range of the mobile device or the other wireless accessory. In exemplary embodiments, the alerts can include a visual alert provided by a user interface of the mobile device, a tactile alert provided via the user device, a visual alert on the device, an audible alert provided via a speaker of the mobile device, an audible alert provided via a speaker of one or more of the wireless accessories, a visual alert provided by an LED on one or more of the wireless accessories, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for preventing a loss of wireless accessories for a mobile device, the computer implemented method comprises:
    calculating, by a processor, a distance between a mobile device and at least one of two or more wireless accessories in communication with the mobile device;
    determining whether the distance between the mobile device and the at least one of two or more wireless accessories is greater than a first threshold distance;
    determining a distance between each of the two or more wireless accessories;
    determining whether the distance between the two or more wireless accessories is greater than a second threshold distance;
    based on a determination that the distance between the mobile device and the at least one of two or more wireless accessories is greater than the first threshold distance, generating an alert by the mobile device that indicates that the at least one of two or more wireless accessories is greater than the threshold distance away from the mobile device; and
    based on a determination that the distance between the two or more wireless accessories is greater than the second threshold distance, generating an alert by the mobile device that the distance between the two or more wireless accessories is greater than the second threshold distance.

2. The computer implemented method of claim 1, wherein at least one of the first threshold distances and the second threshold distance are determined based on a location of the mobile device.

3. The computer implemented method of claim 1, wherein cognitive analytics are used to monitor locations visited by a user of the mobile device and at least one of the first threshold distance and the second threshold distance varies based on a current location of the mobile device.

4. The computer implemented method of claim 1, further comprising:
    determining a location of the at least one of the two or more wireless accessories is greater than the first threshold distance; and
    including an indication of the location in the alert.

5. The computer implemented method of claim 1, wherein the alert is transmitted to one of the two or more wireless accessories within the threshold distance of the mobile device.

6. The computer implemented method of claim 1, wherein the distance between the mobile device and the at least one of two or more wireless accessories in communication with the mobile device is calculated based on a Friis transmission equation.

7. The computer implemented method of claim 1, wherein determining a distance between each of the two or more wireless accessories comprises determining a location of each of the two or more wireless accessories and calculating the distance between each of the two or more wireless accessories.

* * * * *